Sept. 12, 1939.   G. R. DUNCAN   2,172,577
MILK FILTERING AND COOLING DEVICE
Filed March 8, 1937   5 Sheets-Sheet 1
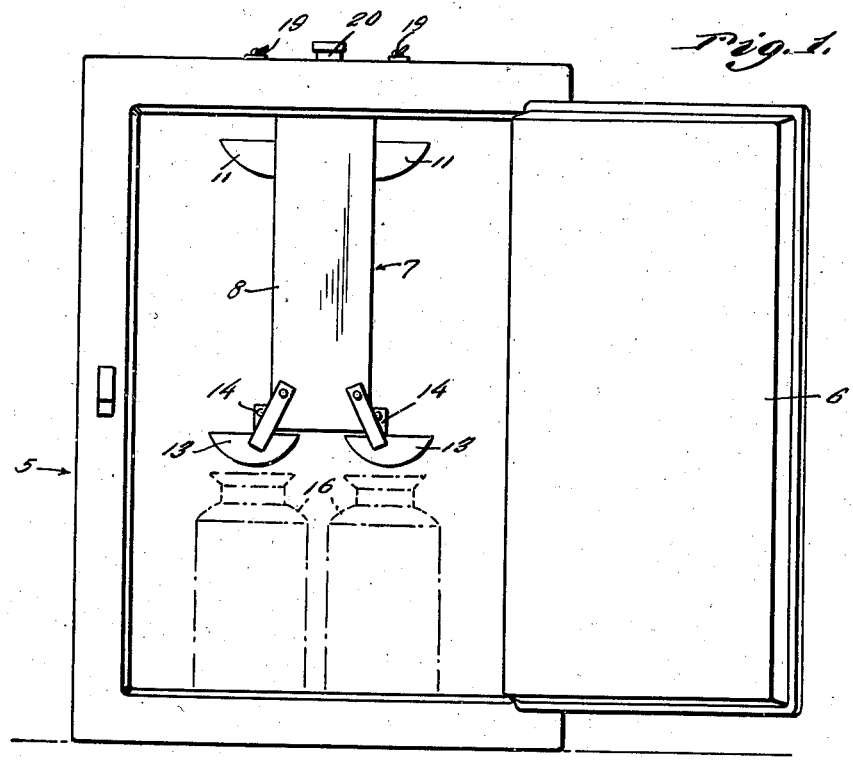
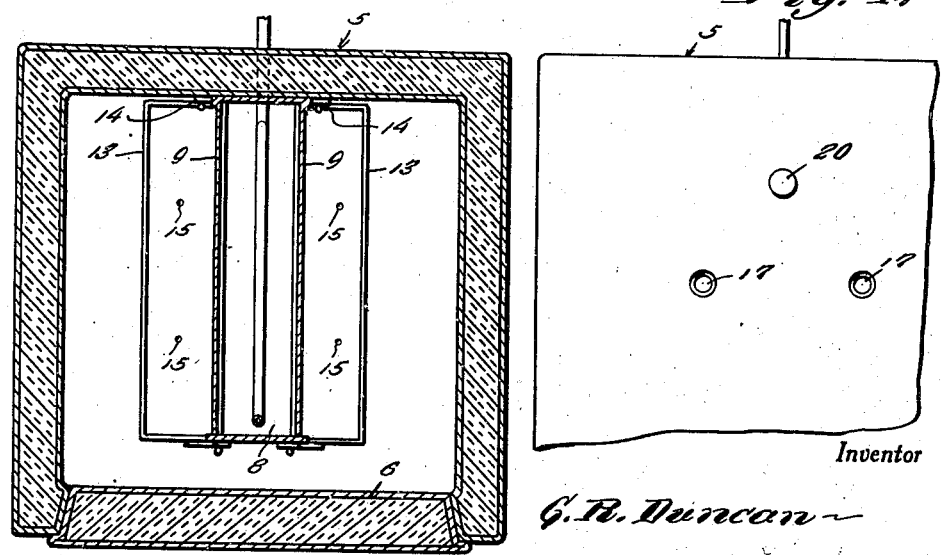
Inventor
G. R. Duncan
By Clarence A. O'Brien
Hyman Berman
Attorneys Sept. 12, 1939.  G. R. DUNCAN  2,172,577
MILK FILTERING AND COOLING DEVICE
Filed March 8, 1937  5 Sheets-Sheet 2
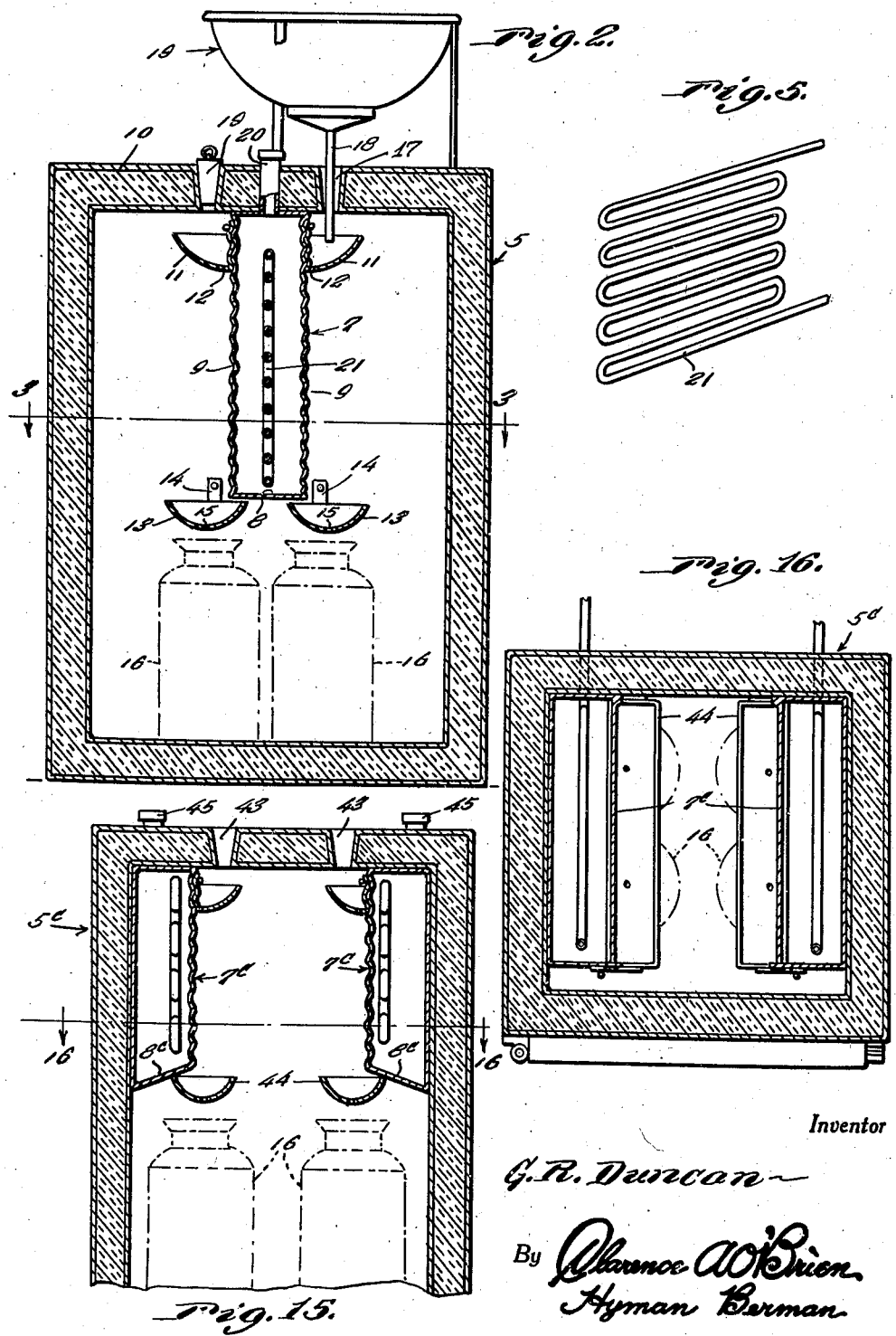

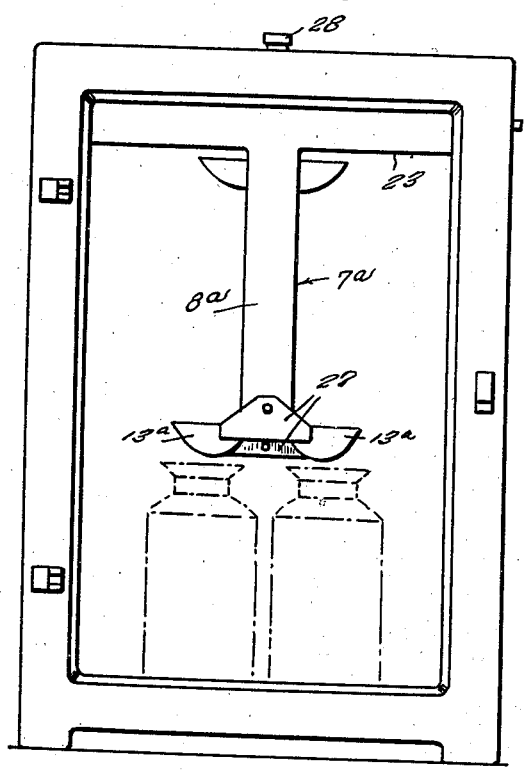
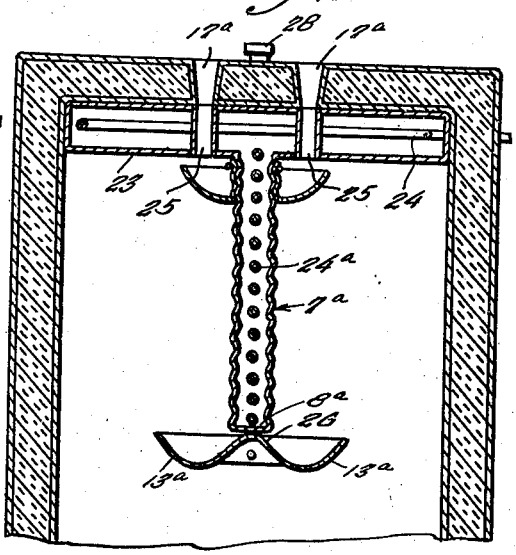
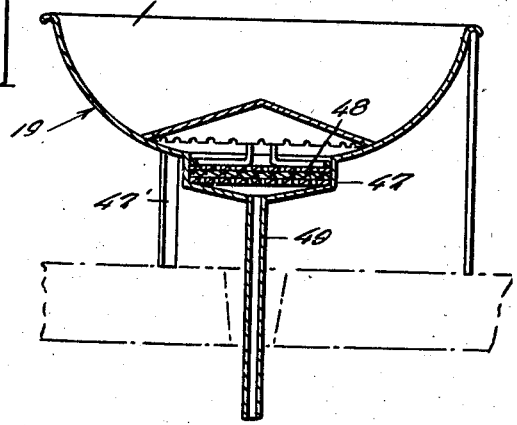
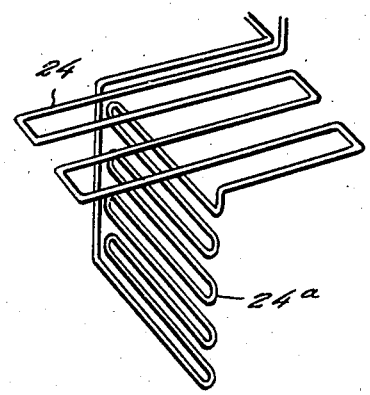

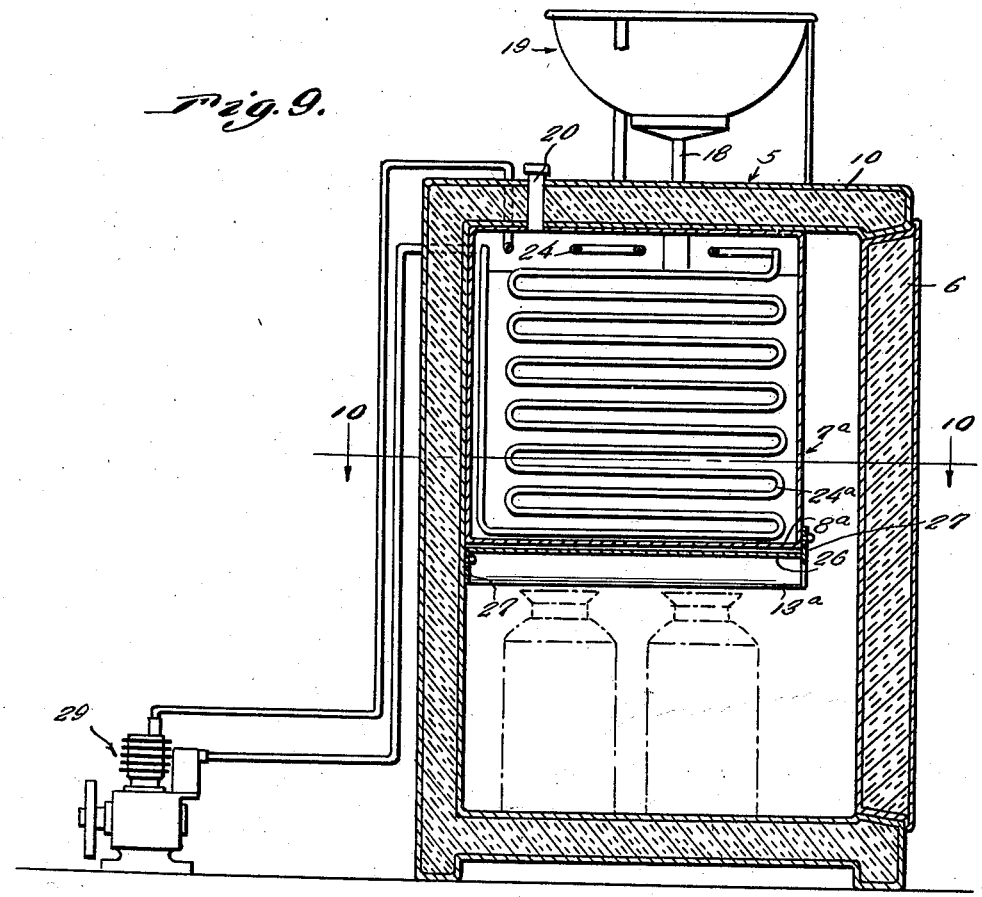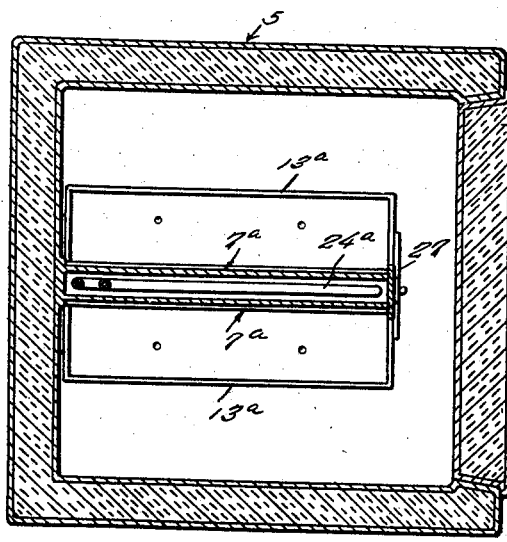

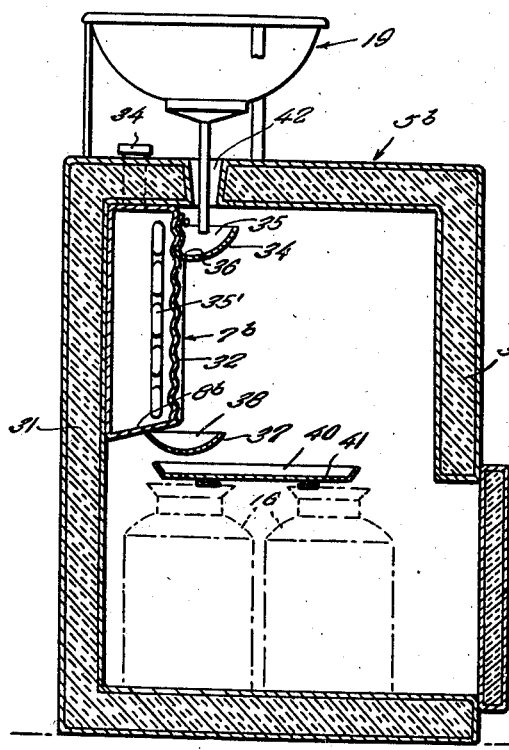
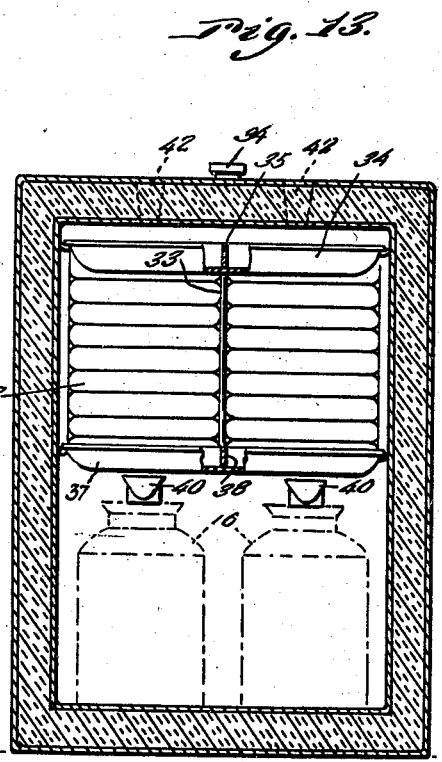
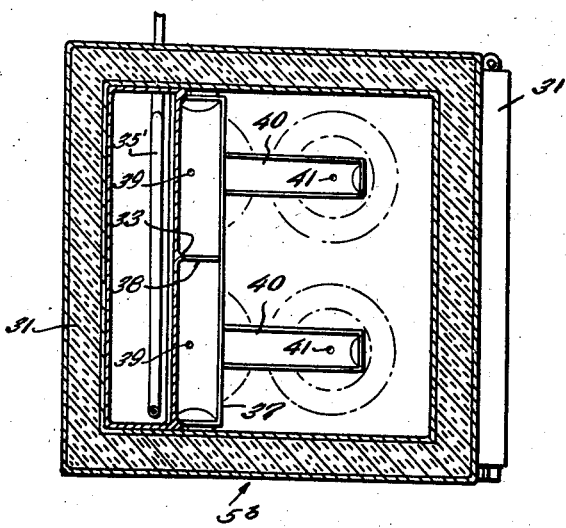

Patented Sept. 12, 1939

2,172,577

UNITED STATES PATENT OFFICE 2,172,577

MILK FILTERING AND COOLING DEVICE

George R. Duncan, Washington, Mo.

Application March 8, 1937, Serial No. 129,718

9 Claims. (Cl. 62—95)

This invention is a device for filtering and cooling milk and for maintaining the milk at a desired temperature until used or transported.

Further, in accordance with the present invention means is provided for storing the cooled milk until used or shipped to dairies, creameries or the like.

Further, in accordance with the present invention an "aerator" or cooling instrumentality is provided within an insulated casing, and is so designed that a section of the surface thereof may be used in the morning for cooling the milk and a second section of the surface thereof may be used in the evening for cooling milk to the end that a clean surface of the aerator is provided for each milk cooling operation; consequently access to the interior of the casing need not be had until after the stored milk is removed from the casing subsequent to the cooling of the night or evening milk cooling operation.

Still further, in accordance with the present invention the insulated casing is so provided as to accommodate through an insulated wall thereof the discharge spout of a filter equipped funnel in such a manner that the funnel may be positioned for directing the milk flowing therethrough on to the selected area or section of a surface of the "aerator" or cooling instrumentality.

Further in accordance with the present invention an apparatus is provided whereby the milk is successively filtered, aerated, refrigerated, and stored in a convenient manner and immediately upon the milk being received directly from the cow by means of either a milking machine or a milk bucket, and without requiring handling of the milk or an otherwise disturbing thereof until the milk is to be used or transported.

The invention, together with its objects and advantages will be best understood from a description of the following description taken in connection with the accompanying drawings wherein—

Figure 1 is a front elevational view of one form of the device embodying the features of the present invention and with the door of the casing in open position.

Figure 2 is a vertical sectional view through the form of the device shown in Figure 1.

Figure 3 is a horizontal sectional view taken substantially on the line 3—3 of Figure 2.

Figure 4 is a fragmentary top plan view.

Figure 5 is a perspective view of a circulating coil for a cooling element and forming part of the "aerator".

Figure 6 is a view somewhat similar to Figure 1 but showing a second form of the invention.

Figure 7 is a fragmentary enlarged vertical sectional view taken through the structure shown in Figure 6.

Figure 8 is a perspective view of a circulating coil forming part of the form of the invention shown in Figure 6.

Figure 9 is a vertical sectional view through the second form of the invention and showing the complete apparatus.

Figure 10 is a detail sectional view taken substantially on the line 10—10 of Figure 9.

Figure 11 is a longitudinal sectional view through a tray forming part of the invention.

Figure 12 is a vertical sectional view through another form of the invention.

Figure 13 is a vertical sectional view.

Figure 14 is a horizontal sectional view through the form of the invention shown in Figure 12.

Figure 15 is a view somewhat similar to Figure 7 but illustrating still another form of the invention.

Figure 16 is a horizontal sectional view taken substantially on the line 16—16 of Figure 15.

Figure 17 is a vertical sectional view through a funnel.

Referring to the drawings more in detail and particularly to the form of the invention shown in Figures 1 to 4, inclusive, it will be seen that in that form of the invention the device comprises a casing 5, the bottom, perpendicular, and top walls of which are insulated as clearly shown. At the front side thereof the casing 5 is provided with a hinged, insulated door 6.

Arranged within the casing 5, perpendicularly is an aerator or cooling instrumentality indicated generally by the reference numeral 7.

The aerator or cooling instrumentality 7 in this form of the invention is shown as consisting of a narrow rectangular shell or casing 8 closed on all sides thereof and provided on opposite sides thereof with vertical corrugated walls 9—9 over which the milk to be cooled flows downwardly, being retarded in its flow by the corrugations to the end that a thorough cooling of the milk will be effected.

At the top thereof the casing 8 is secured in any suitable manner to the top wall 10 of the insulated casing or box 5, and said shell or casing 8 is provided at opposite sides thereof with milk receiving troughs or trays 11. The trays 11 are provided with perforations 12 through which the milk drains to pass downwardly over the corrugated surfaces 9.

The milk passing over the surfaces 9 of the shell 8 is received into trays 13 suitably suspended in operative position to the surfaces or walls 9 through the medium of brackets 14. The trays 13 are provided with perforations 15 through which the cooled milk drains into cans or other suitable receptacles 16 positioned within the cabinet or casing 5.

The wall 10 of the casing or cabinet 5 is provided with through openings 17, there being one opening for each tray 11.

The openings 17 are provided to accommodate the discharge tube 18 of a filter equipped funnel 19 hereinafter more fully referred to; as shown in Figure 2 when one of the openings 17 is being used the other is closed through the medium of a suitable plug 19.

The shell or tank 8 of the aerator or cooling instrumentality 7 is adapted to contain brine or the like to a suitable level and to that end said tank or shell 8 is provided with a filling neck 20 that extends upwardly and outwardly of the casing 5 through the insulated top wall 10 thereof as shown in Figure 2.

Also, positioned within the shell or tank 8 of the aerator or cooling device 7 is a circulating coil 21 for a refrigerant agent, the coil 21 being positioned perpendicularly with the sections of the coil in the same perpendicular plane. The coil 21 will be connected with a compressor or the like for maintaining a continuous circulation of a cooling agent through the coil.

From the above it will be apparent that in actual practice the plug 19 is removed from the selected opening 17 and the discharge tube or nozzle 18 of the filter equipped funnel 19 is passed downwardly through the selected opening to be positioned relative to one of the troughs or trays 11 as shown in Figure 2. The milk will then flow from the filtering funnel into the trough or tray 11 draining from the tray 11 through the openings 12 thereof to flow over the corrugated wall or surface 9 of the aerator 7 whereby the milk will be thoroughly cooled. Passing from the wall or surface 9 the milk is collected in a tray 13, draining from the tray 13 through the perforations 15 into a can or cans 16 provided beneath the tray 13.

In connection with the above, it will be understood that one of the corrugated surfaces or walls 9 will be used for cooling the morning milk and the other of the corrugated surfaces or walls 9 will be used for cooling the evening or night milk with the result that once the cans 16 have been positioned within the casing or cabinet 5 and the door 6 of the cabinet closed it will not be necessary to open the door 6 until after the cooling of the morning milk and consequent to the removal of the cans 16 for transporting the cooled milk to creameries or the like. This is for the reason that one surface or wall 9 is used for the morning milk and the other surface or wall 9 is used for the evening milk so that a clean surface is provided for each cooling operation.

In the form of the invention shown in Figures 6 to 10 the aerator or cooling device, indicated therein by the reference numeral 7a is distinguished over the aerator 7 in that the aerator 8a is narrower than the aerator 7 and has formed integral with the upper end thereof a laterally extending hollow header 23 so as to accommodate a horizontal of flat section of coils 24 formed integral with vertical or perpendicular coils 24a (see Figure 8) accommodated within the vertical parts of the shell 8a of the aerator 7a.

The header 23 is also suitably formed to provide openings 25 therethrough that align with the openings 17a that correspond with the openings 17 of the first form of the invention.

Also, in this form of the invention the trays 13a are formed from a single sheet of metal or the like cut, shaped and dimensioned to provide the trays 13a having a common partition wall 26 as shown in Figure 7. The integral trays 13a are suspended in operative position to the aerator 7a through the medium of suitable brackets 27.

As will be appreciated the shell or tank 8a is adapted to contain brine, and to this end the header 23a is provided with the filling neck 28. The coils 24, 24a are suitably connected with a compressor 29 as shown in Figure 9.

This second form of the invention is used substantially in the same manner and operates in substantially the same way as the first herein described form of the invention.

In the form of the invention shown in Figures 12 to 14, inclusive, the insulated casing or cabinet 5b is provided in the lower portion of its front wall 30 with an opening through which access may be had to the interior of the casing and for this opening there is provided an insulated, hinged door 31.

Also, in this form of the invention the cooling device or aerator indicated by the reference numeral 7b comprises a casing or shell 8b that is positioned with one wall thereof disposed against the rear wall 31 of the casing 5b and also is provided with but a single aerating surface or corrugated wall, 32.

The wall 32 is divided into a pair of aerating surfaces through the medium of a vertical partition 33 so that the section of the wall or surface 32 on one side of the partition 33 may be used for cooling the morning milk, and the surface or section of the wall 32 at the opposite side of the partition 33 may be used for cooling the night milk.

The shell 8b is of course adapted to contain brine and to that end is provided with a suitable filling neck 34' that extends upwardly through an opening in the top insulated wall of the casing 5b as shown in Figure 12.

Also, a circulating coil 35' is positioned perpendicularly within the shell or casing 8b of the aerator and will be connected to a compressor or the like for the circulation of a cooling medium through the coil.

For the aerator 7b there is also provided a milk receiving trough or tray 34 that is disposed across the upper end of the wall 32 and is provided intermediate its ends with a partition 35 in line with the aforementioned partition 33 so that one end of the trough or tray is used for the morning milk and the other end of the trough or tray is used for the night milk. At opposite sides of the partition 35 the tray is suitably perforated at as 36 so that the milk will drain from the selected section of the tray over the proper surface of the wall 32.

Also for collecting the milk as it passes from the wall 32 there is provided at the bottom of the shell or casing 8b a suitably mounted trough or tray 37 that is likewise divided intermediate its ends through the medium of the partition 38 that is in line with partition 33. The sections or ends of the tray 37 are also suitably perforated as at 39 so that the milk will drain therefrom.

To the end that at least two receptacles 16 may be supplied from each section of the trough or tray 37 there is provided for each section or end of the trough or tray 37 a delivery tray 40 disposed over the pair of cans as clearly shown in Figures 12 and 14 and each delivery tray 40 is provided with suitably positioned perforations 41 through which the milk drains into the cans 16.

Also in this form of the invention the top insulated wall of the casing 5b is provided with a pair of openings 42 there being one opening 42 for each section of the wall or aerating surface 32. Thus it will be seen that in this form of the invention one section or surface of the wall 32 is used for cooling the morning milk and the other section or area of wall 32 is used for cooling the night milk. Thus again there is provided at all times a clean surface on the aerator wall for the milk that is to be cooled.

In the form of the invention shown in Figures 15 and 16 instead of providing but a single aerator along the rear wall of the casing, I provide adjacent each side wall of the casing, an aerator 7c to the end that two opposing or confronting aerators are provided, one to be used, for example, for cooling the night milk and the other to be used, for example, for cooling the morning milk. Each of the aerators 7c is constructed substantially identical with the aerator 7b except that the corrugated aerating surface or wall of each aerator 7c, for its entire area may be used for cooling purposes there being no partition such as the partition 33 on the wall of the aerator 7b. Also, in this form of the invention the top wall of the cabinet indicated in Figures 15 and 16 by reference numeral 5c, is provided for each aerator 7c with an opening 43 corresponding to the opening 17 provided in the top wall of the cabinet 5 of the first form of the invention.

Also, and as obvious, where two aerators such as aerators 7c are employed distributing troughs such as shown in 40 in Figures 12 and 14 may be dispensed with, the lower trough 44 of each aerator 7c being sufficient for directing the cooled milk to two or more cans 16.

Also as shown in Figures 15, each aerator shell or casing 8c, being adapted to contain brine, is provided with its individual filling neck 45.

Instead of having two aerators of the character shown in Figure 15 it will be understood that if desired two aerators of the character either of that shown in Figure 2 and indicated by the reference numeral 7, or of the character shown in Figure 7 and indicated by the reference numeral 7a may be employed, and where such aerators are employed they will of course be positioned within the insulated cabinet in suitably spaced relation so that one complete aerator may be used for, for example, the night milk and the other complete aerator may be used for example, for the morning milk.

For use in conjunction with the present invention I provide a funnel detailed in Figure 17 and indicated throughout the several views of the drawings by the reference numeral 19. The funnel 19 is more or less conventional insofar as it consists of the bowl section or part 46 having a drop bottom 47 in which is arranged a suitable filtering device 48. In accordance with the present invention there are suitably associated with the bowl 46 for supporting the funnel properly positioned legs 47' the lower ends of which are adapted to rest on the top wall of the casing 5, or 5b, or 5c, as the case may be, to support the funnel.

Further, in accordance with the present invention the drop bottom 47 of the funnel has integral therewith or otherwise secured thereto an elongated discharge tube 49 that may be of any suitable diameter and which is adapted to extend downwardly through a selected one of the openings in the top wall of the insulated casing for directing the milk into one of the upper troughs or trays of the aerator arranged within the insulated casing or cabinet. In this connection it will be understood that generally the discharge tube 49 will be of a diameter as will insure such a rate of flow of the milk from the funnel as will not permit the milk to flow too freely and swiftly over the surface of the aerator, to the end that the flow of the milk over said surface of the aerator will be such as to insure a thorough cooling of the milk as it passes over the corrugated aerator surface.

In connection with the above, it is well to point out that a salient feature of the invention is the provision of the openings in the insulated wall of the cabinet for accommodating the discharge spout or tube 49 of the filter-equipped funnel for by such the milk is directed on to the aerator or cooling device at a temperature sufficiently constant as to preclude a "souring" of the milk prior to the passing of the milk over the aerator surface.

An invention of this character will be found especially useful to farmers who derive a material income from the sale of milk to dairies and creameries since it provides for a quick and efficient cooling or aerating of the milk, as well as for the filtering of the milk and the storing of the milk at a proper temperature until such time as the milk is to be used or transported to the dairies or creameries.

If desired a brine circulating system, including a pump may be resorted to for maintaining a circular of the brine through the brine tank of the aerator.

Having thus described the invention, what is claimed as new is:

1. In a milk cooling apparatus of the character described, an insulated casing, an aerator mounted vertically in said casing intermediate opposed walls of said casing and said aerator including a brine receptacle having opposed vertical corrugated walls, and said casing having in the top thereof through openings opening into the casing at opposite sides of the brine receptacle and positioned relative to the corrugated walls of the brine receptacle as to be selectively usable for introducing milk into the casing to flow downwardly over a selected corrugated wall of the brine receptacle and a circulating coil for a cooling agent arranged in the brine receptacle.

2. In a milk cooling apparatus of the character described, an insulated casing, an aerator mounted vertically in said casing intermediate opposed walls of said casing and said aerator including a brine receptacle having opposed vertical corrugated walls, said casing having in the top thereof through openings opening into the casing at opposite sides of the brine receptacle and positioned relative to the corrugated walls of the brine receptacle as to be selectively usable for introducing milk into the casing to flow downwardly over a selected corrugated wall of the brine receptacle and a circulating coil for a cooling agent arranged in the brine receptacle, milk receiving trays mounted on the brine receptacle at the upper ends of said corrugated walls, and said trays being provided in the bottoms thereof with perforations whereby milk will drain from the trays to flow downwardly over the corrugated walls of the brine receptacle.

3. In a milk cooling apparatus of the character described, an insulated casing, an aerator mounted vertically in said casing intermediate opposed walls of said casing and said aerator including a brine receptacle having opposed vertical corrugated walls, said casing having in the top thereof through openings opening into the casing at opposite sides of the brine receptacle and so positioned relative to the corrugated walls of the brine receptacle as to be selectively usable for introducing milk into the casing to flow downwardly over a selected corrugated wall of the brine receptacle and a circulating coil for a cooling agent arranged in the brine receptacle, milk receiving trays mounted on the brine receptacle at the upper ends of said corrugated walls, and said trays being provided in the bottoms thereof with perforations whereby milk will drain from the trays to flow downwardly over the corrugated walls of the brine receptacle, and additional trays mounted on opposite sides of the brine receptacle to receive the milk flowing over said corrugated walls, said last mentioned trays being also provided with perforations in the bottoms thereof for the drainage of milk therefrom into cans or receptacles.

4. In a milk cooling apparatus, an insulated casing, and a cooling element arranged within said casing and including a brine tank having at least one vertical corrugated wall, a partition member extending from the upper to the lower end of said corrugated wall and dividing the latter into two cooling surfaces, and said casing having a pair of openings in the top thereof and positioned at opposite sides of the partition member, each opening being adapted to receive the discharge end of a funnel whereby milk from a funnel may be directed over a selected section of said corrugated wall.

5. In a milk cooling apparatus of the character described, an insulated casing, a brine tank mounted in the casing and including a vertical part and a lateral upper part, said lateral part fitting snugly within the casing against the top wall of said casing, a circulating coil for a cooling agent having a part thereof arranged in the vertical part of the brine tank and a second part thereof arranged in the lateral part of the brine tank, said vertical part of the brine tank including a pair of opposed corrugated walls presenting cooling surfaces, and said casing at the top thereof being provided with a pair of spaced openings, and the lateral part of said brine tank being formed to provide a pair of spaced openings disposed at opposite sides of the vertical part of the brine tank and aligning with the openings in the top wall of said casing whereby to accommodate the discharge end of a funnel for use in directing milk to be cooled over a selected corrugated wall of the brine tank.

6. In a milk cooling apparatus of the character described, an insulated casing, a brine tank mounted in the casing and including a vertical part and a lateral upper part, said lateral part fitting snugly within the casing against the top wall of said casing, a circulating coil for a cooling agent having a part thereof arranged in the vertical part of the brine tank and a second part thereof arranged in the lateral part of the brine tank, said vertical part of the brine tank including a pair of opposed corrugated walls presenting cooling surfaces, and said casing at the top thereof being provided with a pair of spaced openings, the lateral part of said brine tank being formed to provide a pair of spaced openings disposed at opposite sides of the vertical part of the brine tank and aligning with the openings in the top wall of said casing whereby to accommodate the discharge end of a funnel for use in directing milk to be cooled over a selected corrugated wall of the brine tank, milk receiving trays mounted on opposite sides of the vertical part of the brine tank below said openings, and respectively provided in the bottoms thereof with perforations through which milk drains from the trays over the corrugated walls of said vertical part of the brine tank, and additional trays mounted at the bottom of the vertical part of the brine tank to receive the milk flowing over said corrugated walls, said last mentioned trays being also provided in the bottoms thereof with perforations through which milk drains therefrom into receptacles accommodated within the casing.

7. In a device of the class described, an insulated casing including a door for providing access to the interior of the casing, a chamber containing brine in the casing having a vertically arranged corrugated wall, a refrigerant coil within the chamber, a distributor at the upper end of the vertical wall at the exterior thereof, the top wall of the casing having a small opening therein above the distributor for permitting fluid to be placed from the exterior of the casing into the distributor, a closure for said small opening, and means at the lower end of said vertical corrugated wall for receiving the liquid from said wall and delivering the liquid into a container placed in the casing.

8. In a milk cooling and storage apparatus, an insulated casing for receiving a milk receptacle, a tank in an upper portion of the casing and above the space in which the receptacle is placed, said tank having a vertically arranged corrugated wall, means for delivering milk against the upper portion of said wall, means for directing the milk from the lower end of said wall into the receptacle and a refrigerant in the tank for cooling the wall as well as the interior of the casing.

9. In a milk cooling apparatus, an insulated casing, a tank in the casing, a refrigerant in the tank, said tank being of a size to cool the interior of the casing, said tank having at least two corrugated surfaces cooled by the refrigerant therein, means for distributing milk over each corrugated surface, said casing having openings therein, one for each distributing means for permitting milk to be placed in a selected distributing means and means for conveying the milk from each corrugated surface to a receptacle located in the casing.

GEORGE R. DUNCAN.